United States Patent
Singh et al.

(10) Patent No.: US 11,281,655 B2
(45) Date of Patent: Mar. 22, 2022

(54) DATA MIGRATION VALIDATION

(71) Applicant: MICROSOFT TECHNOLOGY LICENSING, LLC, Redmond, WA (US)

(72) Inventors: Jaskaran Singh, Redmond, WA (US); Sina Hakami, Bothell, WA (US); Szymon Madejczyk, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 16/448,785

(22) Filed: Jun. 21, 2019

(65) Prior Publication Data

US 2019/0310973 A1    Oct. 10, 2019

Related U.S. Application Data

(63) Continuation of application No. 14/866,406, filed on Sep. 25, 2015, now Pat. No. 10,331,656.

(51) Int. Cl.
| | | |
|---|---|---|
| *G06F 16/00* | (2019.01) | |
| *G06F 16/23* | (2019.01) | |
| *G06F 16/11* | (2019.01) | |
| *G06F 16/951* | (2019.01) | |
| *G06F 16/21* | (2019.01) | |

(52) U.S. Cl.
CPC ........ *G06F 16/2365* (2019.01); *G06F 16/116* (2019.01); *G06F 16/214* (2019.01); *G06F 16/951* (2019.01)

(58) Field of Classification Search
CPC ........ G06F 16/119; G06F 11/14; G06F 11/16; G06F 11/203; G06F 11/2064; G06F 11/2733; G06F 11/25; G06F 11/2273; G06F 11/3624; G06F 6/215; G06F 16/24532; G06F 16/2365; G06F 16/214; G06F 16/951; G06F 16/116
See application file for complete search history.

(56) References Cited

U.S. PATENT DOCUMENTS

| | | | | |
|---|---|---|---|---|
| 5,504,879 | A  * | 4/1996 | Eisenberg | G06F 8/71 |
| 6,701,345 | B1 * | 3/2004 | Carley | G06F 16/252 709/205 |
| 7,403,901 | B1 * | 7/2008 | Carley | G06F 16/258 705/2 |
| 7,804,982 | B2 * | 9/2010 | Howard | G07C 9/253 382/115 |
| 8,768,684 | B2 * | 7/2014 | Mitsuzawa | G06F 9/4856 703/26 |
| 9,747,095 | B1 * | 8/2017 | Furman | H04L 41/0886 |
| 10,073,869 | B2 * | 9/2018 | Singh | G06F 16/214 |

(Continued)

*Primary Examiner* — Leslie Wong
(74) *Attorney, Agent, or Firm* — Workman Nydegger

(57) ABSTRACT

A system for validating data migrated from a first data store with source data to a second data store for destination data. A comparator is configured to access entity data for a particular entity which has been migrated from a first data store to a second data store. The comparator queries the first data store to a first set of comparison data from the first data store and obtains a second set of comparison data from the second data store. It then compares the first set of data with the second set of data to validate the migration of the data from the first to the second data store.

20 Claims, 3 Drawing Sheets

(56) References Cited

U.S. PATENT DOCUMENTS

| | | | |
|---|---|---|---|
| 2002/0103779 A1* | 8/2002 | Ricart | G06F 9/44505 |
| 2002/0116399 A1* | 8/2002 | Camps | G06Q 10/10 |
| 2004/0204949 A1* | 10/2004 | Shaji | G06F 11/1415 717/174 |
| 2005/0039180 A1* | 2/2005 | Fultheim | G06F 9/45533 718/1 |
| 2005/0065987 A1* | 3/2005 | Telkowski | G06F 11/0727 |
| 2005/0071824 A1* | 3/2005 | K. N. | G06F 11/3636 717/138 |
| 2005/0289446 A1* | 12/2005 | Moncsko | G06F 16/9558 715/208 |
| 2006/0217111 A1* | 9/2006 | Marolia | G06Q 30/06 455/418 |
| 2006/0222160 A1* | 10/2006 | Bank | G06F 16/275 379/221.08 |
| 2007/0226304 A1* | 9/2007 | Virk | G06Q 10/107 709/206 |
| 2007/0238524 A1* | 10/2007 | Harris | A63F 13/02 463/42 |
| 2008/0082956 A1* | 4/2008 | Gura | G06Q 10/0631 717/101 |
| 2008/0127041 A1* | 5/2008 | Gura | G06Q 10/06 717/101 |
| 2008/0222216 A1* | 9/2008 | Jorden | G06F 8/70 |
| 2011/0276675 A1* | 11/2011 | Singh | G06F 9/4856 709/223 |
| 2012/0265726 A1* | 10/2012 | Padmanabhan | G06F 16/214 707/602 |
| 2013/0198130 A1* | 8/2013 | Resch | G06F 3/0619 707/609 |
| 2013/0212200 A1* | 8/2013 | Dennis | H04L 51/22 709/206 |
| 2014/0222766 A1* | 8/2014 | Sitt | G06F 16/214 707/687 |
| 2015/0046389 A1* | 2/2015 | Dhayapule | G06F 11/079 707/602 |
| 2015/0142858 A1* | 5/2015 | Bryan | G06F 16/258 707/809 |
| 2015/0188927 A1* | 7/2015 | Santhi | H04L 67/1002 726/4 |
| 2016/0048602 A1* | 2/2016 | Yastrebenetsky | H04L 67/02 715/234 |
| 2016/0099998 A1* | 4/2016 | Richman | H04L 67/06 709/202 |
| 2016/0253339 A1* | 9/2016 | Ambrose | G06F 3/0647 707/693 |
| 2019/0235744 A1* | 8/2019 | Burpulis | G06F 3/04842 |
| 2020/0174630 A1* | 6/2020 | Rosenberg | G06F 3/0482 |

* cited by examiner

DATA MIGRATION VALIDATION

CROSS-REFERENCE TO RELATED APPLICATIONS

This application is a continuation of U.S. patent application Ser. No. 14/866,406 filed on Sep. 25, 2015, entitled "DATA MIGRATION VALIDATION," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Data is often migrated from one data store to a second data store. This may occur as new systems are implemented. There is a desire to preserve data from old systems and to move that data to new systems. For example, a legacy online calendaring system (such as Hotmail available from Microsoft, Corporation of Redmond, Washington) may store user data including calendar items. A new online system (such as Office 365 is also available from Microsoft, Corporation of Redmond, Wash.) may, in addition to new rich functionality, also include calendaring functionality that may be able to make use of user data from the legacy calendaring system. Thus, it may be advantageous to move data from the legacy email system to the new online system.

Migrating data typically involves the new system obtaining the data, using some standardized file format (such as iCalendar in the email example above). Thus, data will be taken from a native format of the first system, transformed into a standardized file format, transmitted to and received by the second system, transformed into a native format for the second system, and stored at a data store for the second system. There exist various opportunities along this process for portions of the data to not be transferred, or for portions of the data to become corrupted at the second system.

Thus, it may be useful to validate the data migration. One general validation that has been used to validate a migration is to evaluate a corrupt item count, which essentially is the count of data items which cannot be migrated. This is sufficient to catch data loss at the service level, but is not ideal from a user perspective. In particular, for a given user, it is unknown whether or not that user's individual data was successfully migrated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment. The method includes acts for migrating entity data from a first data store to a second data store and validating the migration. The method comprises migrating entity data for a particular entity from a first data store to a second data store using a first data protocol. The method further includes querying the first data store with a first query to obtain first set of comparison data from the first data store. The first query is performed using a second data protocol that is different than the first data protocol. The method further comprising obtaining a second set of comparison data from the second data store. The method further comprises comparing the first set of comparison data with the second set of comparison data to validate migration of the data from the first data store to the second data store.

Another embodiment includes a system comprising a set of data which has been migrated from a first data store to a second data store and a comparator. The comparator is configured to access the data which has been migrated from the first data store by querying the first data store using a first data protocol to obtain a first result set of data in a first data format. The comparator also queries a second data store to obtain a second result set of data. The comparator then compares the first result set of data to the second result set of data to generate a set of discrepancies between the two sets of data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
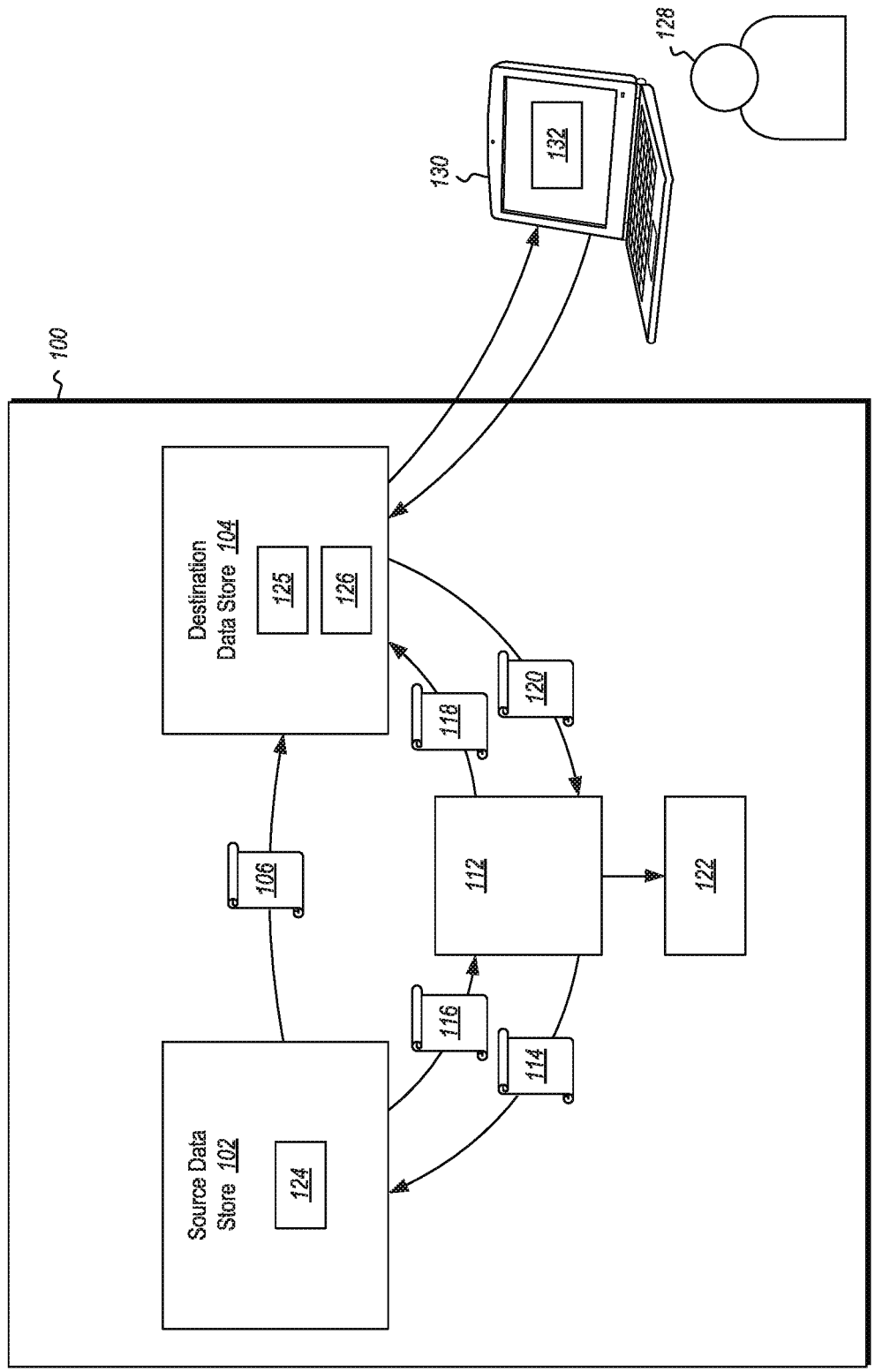
FIG. 1 illustrates a system for comparing data which has been migrated from a source data store, with data stored in a particular data format to a destination data store with data stored in a different data format.

When data is migrated over from a first source system to a second destination system, typical validation includes generating a list of items which could not be converted between the two systems. Embodiments described herein are configured to validate and identify inconsistencies between data at the source system and the destination system, using a separate pipeline which is different from the pipeline used to migrate the data from the source system to the destination system in the first instance. Particular attention may be placed on validating migrations for individual entity data as each entity is migrated from a source system to a destination system. Such entities may be, for example, users, folders, directories, or other entities.

For example, to catch inconsistencies from an entity point of view, embodiments may implement a validation sub routine which is initiated once all of an entity's data has been migrated over from the source system to the destination system, but before the entity is allowed to access the data at the destination system. This sub-routine uses a separate pipeline to fetch the data from the entity account at the source system and compare it to the data stored in the corresponding entity account at the destination system. Any inconsistencies between individual corresponding data items at the source and destination systems that are detected are reported as a corrupt data item.

For example, when migrating data from a source system such as Hotmail, available from Microsoft Corporation of Redmond, Wash. to Office 365, also available from Microsoft Corporation of Redmond, Wash., after data has been migrated from Hotmail to Office 365 using the iCalendar file format, embodiments may use the Exchange ActiveSync (EAS) data protocol with IP filtering based authentication to get the Calendar data for the users and then compare it with the data stored in the migrated mailboxes.

Note that in some embodiments, the migration and/or validation may be done on a per user account level. In particular, embodiments may be implemented where data is migrated over and validated for each user at a user granularity. Thus, for example, in one embodiment, data may be migrated by using mailbox operations on a user's mailbox, as opposed to migrating user data as part of a wholesale and indiscriminate migration of all data on a server.

In particular, a user's data is identified individually, and migrated based on the data belonging to the particular user. Once the data has been migrated, operations may be performed, again at a user account level, such as by performing operations on a user's mailbox at both the source system and the destination system to obtain the same data from each system for the user. The data from the different systems is then compared to determine if there are any differences. If migration of data is sufficiently error free, then the particular data for the particular user can be released to the user such that the user can obtain the data on the destination system. Thus, rather than validating the entire destination server as a whole, data can be validated at a user level and released at the user level. In this way, even if there are errors and/or delays in migrating data, only the users affected by those errors and/or delays will not be able to obtain their data at the destination server, while unaffected users will be able to obtain their data as soon as it is migrated and validated.

While the example here illustrates migrating data at the user level, it should be appreciated that any level of partitioning of data may be performed. For example, data could be migrated at the folder level in a folder hierarch data system. While not enumerated herein, other levels could be used depending on the system type and the partitioning of data.

The following discussion now refers to a system with a number of components which perform methods and method acts. Although the method acts may be discussed in a certain order or illustrated in a flow chart as occurring in a particular order, no particular ordering is required unless specifically stated, or required because an act is dependent on another act being completed prior to the act being performed.

Referring now to FIG. 1, a system for data migration and validation 100 is illustrated. It is primarily comprised of a source data store 102, a destination data store 104 and a comparator 112.

One embodiment migrates data from a source data store 102 to a destination data store 104 by first exporting data 106 from the source data store to the destination data store 104 using a first data protocol. The data 106 is imported into the destination data store 104. Note that the first data protocol may include the use of particular file formats, such as iCalendar formats. Thus, using different file formats, even when the same underlying transport protocol is used for two different data transfers, should be considered, as used herein, as different protocols.

After the data 106 is migrated from the source data store 102 to the destination data store 104, the 106 data is validated by a comparator 112 which sends a query 114 to the source data store using a second data protocol which is different from the first data protocol used for migrating data 106. This query 114 produces a first result-set of data 116. Likewise, the comparator 112 sends a query 118 to the destination data store 104 and receives a second result-set of data 120. The comparator 112 compares the records in the first result-set of data 116 and the second result-set of data 120 and creates a set of discrepancies 122 between the two result-sets.

Different embodiments may use different protocols for the migration of the records to the intermediate records 108. Similarly, the protocols used by the comparator for querying the source data store 102 and the destination data store 104 may be different from the protocol used to migrate the records, and may be different from each other.

Figure 2:
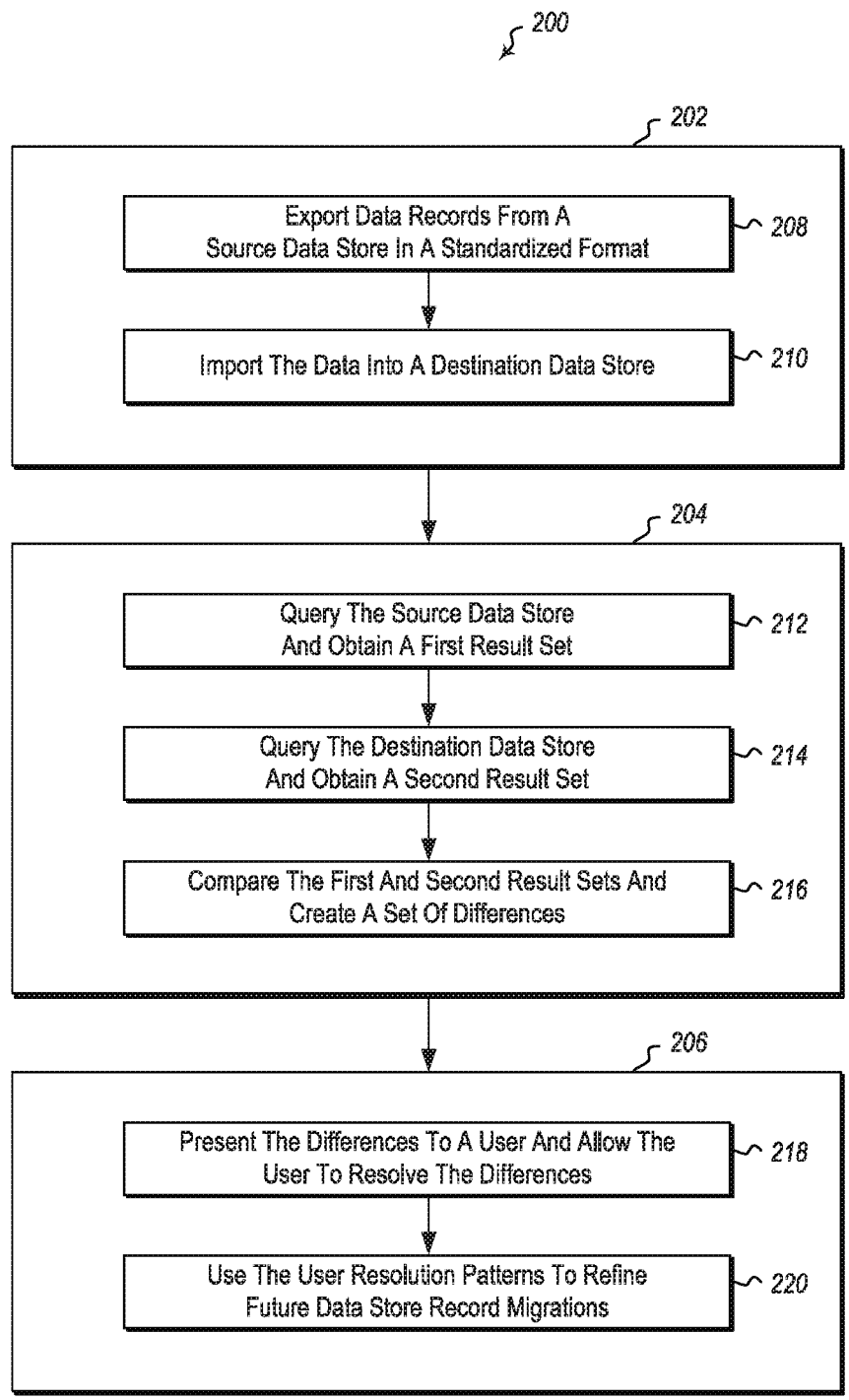
FIG. 2 illustrates a process for migrating data from one data store to another data store with a different format, validating data migration and refining the migration.

Referring now to FIG. 2, a flow 200 is shown which shows various stages of processing, including migration 202, validation 204 and refinement 206.

In the example illustrated, migration 202 comprises exporting data from a source data store in a standardized format (act 208), for example, using a standard data protocol such as iCalendar. The process may additionally or alternatively use other protocols or file formats including, but not limited to, vCalendar in the iCalendar protocol, vCard, EML, EWS, PST, POP, IMAP, MAPI, EAS, or SMTP. The migration process includes importing the data into a destination data store (act 210).

Validation 204 may include a comparator querying the source data store to obtain a first result set (act 212). The result set contains at least a portion of the data from the source data store. For example, the query may be in a form using any of the previously mentioned data protocols or other appropriate formats. Further, validation comprises the comparator querying the destination data store to obtain a second result set containing at least a portion of the data from the destination data store (act 214). The query may be, in a form using any of the previously mentioned data protocols or other appropriate formats.

Note that as mentioned above, the queries may be queries to mailboxes 124 and 126 for a particular entity. Thus, in such embodiments, the queries may be of a protocol format appropriate for such functionality. Thus, for example, the protocols used may be the same protocols that would be expected to be used by client software applications used by an entity to access their mailbox. Thus, for example, FIG. 1 illustrates a user 128 at a client machine 130 using a client application 132 to access the user's mailbox 126 at the destination data store 104. The client application 132 is a particular application having particular functionality suited to the destination data store 104. In particular, the client application 132 is a client specially configured to function with the destination data store 104. In this example, the comparator 112 may use the same protocol as the client application 132 to query the destination data store 104, and in particular, the mailbox 126.

Similarly, there may be particular clients used by the user 128 to access the user account 124 at the source data store 102. Those clients may use different protocols and/or access methods than the client 132 (or other clients) used to access the mailbox 126. For example, the source data store may be a legacy data store that only works with older clients. Alternatively, the source and destination data stores may be of different types (e.g., on premise server versus cloud based services). Thus different protocols may be used to access the different mailboxes 124 and 126 at the different data stores.

FIG. 2 further illustrates that validation includes comparing the first and second result sets to create a set of differences (act 216). In particular, the first result set from the source data store is compared to the second result set from the destination data store to determine differences in data at the first data store and data at the second data store. Some embodiments may include creating a third data set which contains the discrepancies between the first and second data sets. This comparison may produce a different set of discrepancies for each pair of result sets that were generated by using a different query protocol.

The query of the destination data store may be made in a format that is native to the destination data store. In some such embodiments, the data from the query to source data store is first converted to the native format of the destination data store before the two sets of data are compared.

In one embodiment the comparator may query the source and destination data stores using a plurality of data protocols, and obtain a data set from each data store for each protocol used to query the data stores. In this embodiment the comparator may compare the corresponding resulting data sets for each protocol.

In one embodiment a plurality of queries may be made on the source and destination data stores using a plurality of different clients. For example, various different email client's or client emulators, such as various different client email and/or calendaring programs may be used to query the data on the source and destination data stores. These queries can be compared to determine if the data at the source and destination data stores is the same.

The comparison of different clients may be performed in a number of different fashions. For example, in some embodiments, data obtained from the same client or client emulator could be compared to each other. However, in other embodiments, queries from different combinations of clients or client emulators could be used. For example, assume that three different clients or client emulators were used.

In one example, a first client could query both the source and destination data stores. The results from this query could be compared. Similarly, a second client could query both the source and destination data stores. The results from this query could be compared. Similarly, a third client could query both the source and destination data stores. The results from this query could be compared. And differences could be noted and reported to a database administrator.

Alternatively (or additionally), the three different clients could each query both data stores and results from different clients could be compared. For example, the results from the first client could be compared to the results from the second and third clients. Results from the second client could be compared to results from the first and third clients. Results from the third client could be compared to results from the first and second clients. This would provide a diverse array of different comparisons to perform a thorough analysis of data migration.

In one embodiment the comparator may determine that the number of discrepancies, or the number of discrepancies combined with the types of discrepancies are either zero, or are below a tolerable threshold, and the comparator may declare the migration valid.

In one embodiment the comparator may determine that the number and/or types of discrepancies exceed a tolerable threshold, and the comparator may forward the set of discrepancies on to a user-resolution process or "refinement" process as illustrated at 206.

The tolerable discrepancy threshold may be defined in a variety of ways. In one embodiment the threshold may be defined in terms of a raw number of discrepancies. In another embodiment, the tolerable discrepancy threshold may be defined in terms of a percentage of the number of migrated records. In yet another embodiment the threshold may be defined in terms of consistent errors for certain fields or certain types of fields. In some embodiments, the threshold may be defined in other terms, or in some combination these terms and possibly in combination with other terms.

Figure 3:
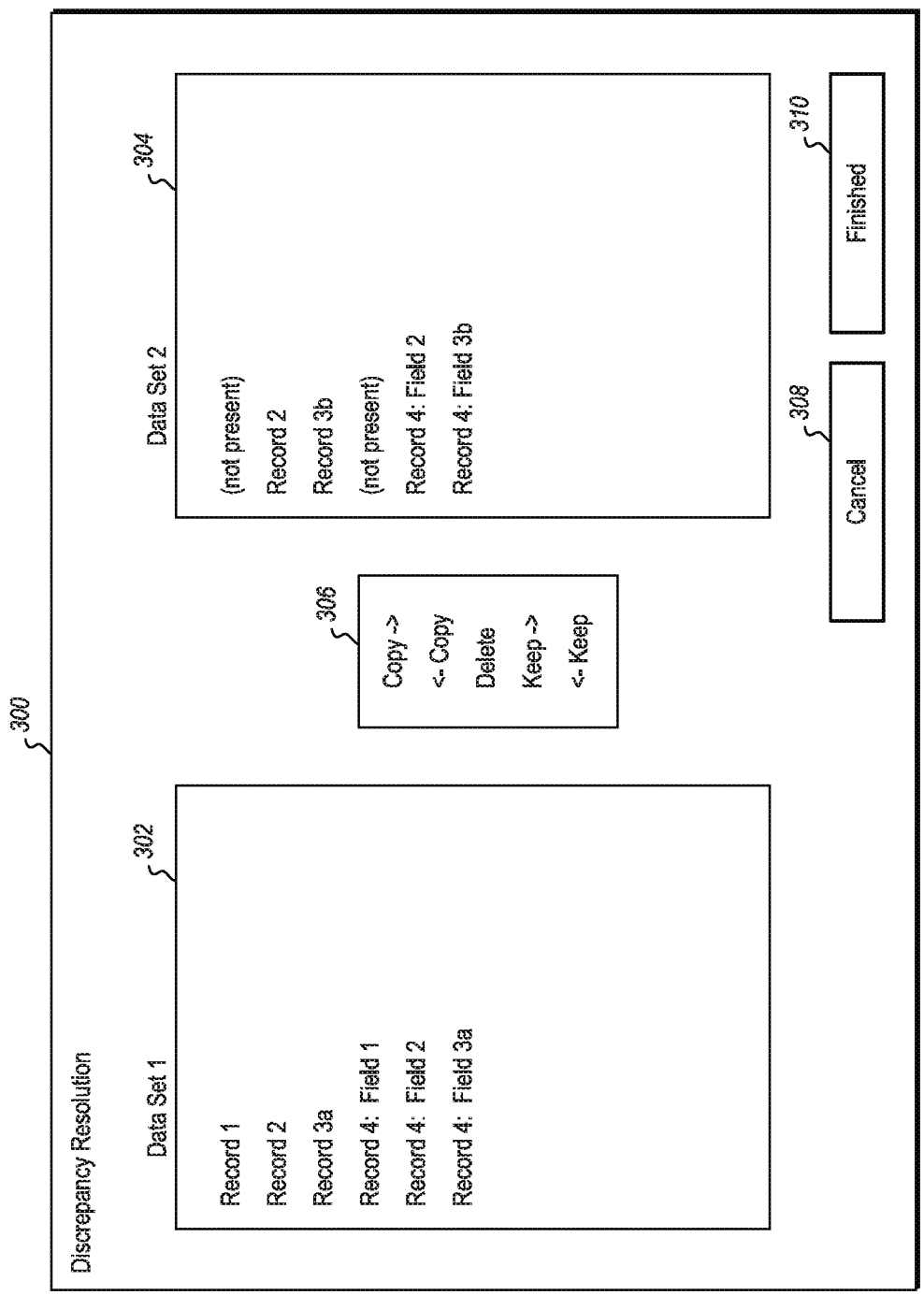
FIG. 3 illustrates one embodiment of a user interface presented to a user to resolve the discrepancies between the source data store and the migrated data in the destination data store.

In one embodiment a user-resolution or refinement process 206 presents the user with a discrepancy resolution interface, such as interface 300 illustrated in FIG. 3. One embodiment of the interface allows the user to easily compare the discrepancies between a first data set 302 and a second data set 304. In this embodiment the user can select a discrepancy by clicking on its representation in either data set 302, 304 and activating an appropriate resolution control 306. Such controls might include, but not be limited to, (1) controls that would allow the user to copy a missing record or field into the data set from which it is missing, (2) delete a record or field from one or both data sets, or (3) keep one version or the other of a record or field that is different in the two data sets.

An embodiment might include a "Cancel" button 308 that would allow the user to abandon any specific resolutions the user had specified, or a "Finished" button 310 which would allow the user to signal that the resolution process is complete.

Referring once again to FIG. 2, one embodiment of refinement 206 presents differences to a user and allows the user to resolve the differences (act 218). In some such embodiments, a comparator can identify patterns in the user's resolutions and as illustrated at 220, use those patterns to refine future migrations from one data store to another such that the future migrations produce fewer discrepancies when comparing the source and destination data sets.

Illustrated now, a detailed example with respect to FIG. 3, one embodiment includes an interface provided to the user of the migrated data. The migration discrepancies between the source and destination data stores are presented to the user in a form like that in FIG. 3. This interface presents the records and fields that the comparator determined to be different between the source data store and the destination data store.

This embodiment of the resolution control interface would allow the user to select a row representing one of the above mentioned discrepancies and, using the resolution controls 306, choose to copy a missing record from one data set to the other, or pick one version of a record of field which contained different values in the data sets and keep that version of the record or field.

In this embodiment the "Cancel" button 308 would allow the user to abandon the resolutions specified. The "Finished" button 310 would allow the user to mark the resolutions as complete.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage media having stored thereon instructions that are executable by the one or more processors and that, when executed, cause the computer system to at least:
   migrate entity data for a particular entity from a first data store to a second data store;
   identify a first comparison data set corresponding to entity data being migrated from a first data store to a second data store, the first comparison data set being generated from a plurality of first queries run on the first data store, each first query of the plurality of first queries being made by a different client emulator in a first plurality of client emulators that differ from each other;
   identify a second comparison data set corresponding to the entity data, the second comparison data set being generated from a plurality of second queries run on the second data store, each second query of the plurality of second queries being made by a different client emulator in a second plurality of client emulators that differ from each other; and
   present the first comparison data set along with the second comparison data set in a discrepancy resolution interface along with a resolution control that includes a plurality of separate selectable controls for resolving any discrepancies between the first comparison data set and the second comparison data set.

2. The computer system of claim 1, wherein the instructions are also executable to cause the computer system to select a discrepancy in response to input directed at one or more entry in either of the first comparison data set or the second comparison data set.

3. The computer system of claim 2, wherein the instructions are also executable to cause the computer system to apply a discrepancy resolution process for resolving the discrepancy in response to input directed at a particular resolution control included in the plurality of separate selectable controls from the resolution control subsequent to the discrepancy being selected.

4. The computer system of claim 3, wherein the particular resolution control comprises a control for copying a missing record or field into the first comparison data set or the second comparison data set.

5. The computer system of claim 3, wherein the particular resolution control comprises a control for deleting a record or field in the first comparison data set or the second comparison data set.

6. The computer system of claim 3, wherein the particular resolution control comprises a control for selecting a version of a record or field in at least one of the first comparison data set or the second comparison data set.

7. The computer system of claim 3, wherein the instructions are also executable to cause the computer system to present a cancel control button which, when selected, causes any user selected resolutions to be abandoned.

8. The computer system of claim 3, wherein the instructions are also executable to cause the computer system to present a finish control button which, when selected, causes a signal to be generated for completing the discrepancy resolution process.

9. The computer system of claim 3, the instructions are also executable to cause the computer system to identify one or more patterns of resolution based on a user resolving discrepancies with the discrepancy resolution process, and wherein the one or more patterns of resolution are used to modify one or more subsequent migrations between the first data store and the second data store, such that the one or more subsequent migrations produce fewer discrepancies in subsequent comparison data sets for the one or more subsequent migrations.

10. The computer system of claim 1, wherein at least one of the plurality of first queries is performed using a first data protocol that is different than a second data protocol used for at least one of the plurality of second queries.

11. In a computing environment, a method comprising:
migrating entity data for a particular entity from a first data store to a second data store;
identifying a first comparison data set corresponding to entity data being migrated from a first data store to a second data store, the first comparison data set being generated from a plurality of first queries run on the first data store, each first query of the plurality of first queries being made by a different client emulator in a first plurality of client emulators that differ from each other;
identifying a second comparison data set corresponding to the entity data, the second comparison data set being generated from a plurality of second queries run on the second data store, each second query of the plurality of second queries being made by a different client emulator in a second plurality of client emulators that differ from each other; and
presenting the first comparison data set along with the second comparison data set in a discrepancy resolution interface along with a resolution control that includes a plurality of separate selectable controls for resolving any discrepancies between the first comparison data set and the second comparison data set.

12. The method of claim 11, wherein the method further includes selecting a discrepancy in response to input directed at one or more entry in either of the first comparison data set or the second comparison data set.

13. The method of claim 12, wherein the method further includes applying a discrepancy resolution process for resolving the discrepancy in response to input directed at a particular resolution control included in the plurality of separate selectable controls from the resolution control subsequent to the discrepancy being selected.

14. The method of claim 13, wherein the particular resolution control comprises a control for copying a missing record or field into the first comparison data set or the second comparison data set.

15. The method of claim 13, wherein the particular resolution control comprises a control for deleting a record or field in the first comparison data set or the second comparison data set.

16. The method of claim 13, wherein the particular resolution control comprises a control for selecting a version of a record or field in the first comparison data set or the second comparison data set.

17. The method of claim 13, wherein the method further includes:
presenting a cancel control button which, when selected, causes any user selected resolutions to be abandoned; and
presenting a finish control button which, when selected, causes a signal to be generated for completing the discrepancy resolution process.

18. The method of claim 13, the method further comprising identifying one or more patterns of resolution based on a user resolving discrepancies with the discrepancy resolution process, and wherein the one or more patterns of resolution are used to modify one or more subsequent migrations between the first data store and the second data store, such that the one or more subsequent migrations produce fewer discrepancies in subsequent comparison data sets for the one or more subsequent migrations.

19. The method of claim 13, wherein at least one of the plurality of first queries is performed using a first data protocol that is different than a second data protocol used for at least one of the plurality of second queries.

20. A physical computer-readable storage medium having stored thereon instructions that are executable by one or more processors and that, when executed, cause a computer system to at least:
migrate entity data for a particular entity from a first data store to a second data store;
identify a first comparison data set corresponding to entity data being migrated from a first data store to a second data store, the first comparison data set being generated from a plurality of first queries run on the first data store, each first query of the plurality of first queries being made by a different client emulator in a first plurality of client emulators that differ from each other;
identify a second comparison data set corresponding to the entity data, the second comparison data set being generated from a plurality of second queries run on the second data store, each second query of the plurality of second queries being made by a different client emulator in a second plurality of client emulators that differ from each other; and present the first comparison data set along with the second comparison data set in a discrepancy resolution interface along with a resolution control that includes a plurality of separate selectable controls for resolving any discrepancies between the first comparison data set and the second comparison data set.

\* \* \* \* \*